(12) United States Patent
Naumann (10) Patent No.: US 9,702,540 B2
(45) Date of Patent: Jul. 11, 2017

(54) ILLUMINATION SYSTEM FOR MOBILE DISPENSING DEVICES

(71) Applicant: The Olitus Corporation, Bloomington, MN (US)

(72) Inventor: Curtis William Naumann, Minneapolis, MN (US)

(*) Notice: Subject to any disclaimer, the term of this patent is extended or adjusted under 35 U.S.C. 154(b) by 72 days.

(21) Appl. No.: 14/817,384

(22) Filed: Aug. 4, 2015

(65) Prior Publication Data
US 2017/0038059 A1    Feb. 9, 2017

(51) Int. Cl.
| | | |
|---|---|---|
| H05B 33/08 | (2006.01) | |
| H05B 37/02 | (2006.01) | |
| F21V 33/00 | (2006.01) | |
| F21V 5/04 | (2006.01) | |
| F21V 23/04 | (2006.01) | |
| F21Y 115/10 | (2016.01) | |
| F21Y 113/10 | (2016.01) | |

(52) U.S. Cl.
CPC ...... *F21V 33/0036* (2013.01); *F21V 23/0492* (2013.01); *H05B 33/0845* (2013.01); *H05B 37/0227* (2013.01); *F21V 5/045* (2013.01); *F21Y 2113/10* (2016.08); *F21Y 2115/10* (2016.08)

(58) Field of Classification Search
None
See application file for complete search history.

(56) References Cited

U.S. PATENT DOCUMENTS

| | | | | |
|---|---|---|---|---|
| 3,184,587 | A * | 5/1965 | Quijada | A47G 19/24 200/60 |
| 6,550,949 | B1 * | 4/2003 | Bauer | B60Q 1/0023 257/118 |
| 7,616,097 | B1 * | 11/2009 | Whang | G09G 3/3406 340/321 |
| 7,753,545 | B2 * | 7/2010 | Groover | F21V 23/04 116/227 |
| 8,355,003 | B2 * | 1/2013 | Pope | A63F 13/06 345/156 |
| 8,629,623 | B2 * | 1/2014 | Mountain | H04M 1/22 315/200 A |
| 2004/0240198 | A1 * | 12/2004 | Van Laar | A42B 3/0433 362/105 |
| 2005/0047114 | A1 * | 3/2005 | Harrell | B65D 51/248 362/101 |
| 2007/0171627 | A1 * | 7/2007 | Hsu | A47G 19/2227 362/101 |
| 2007/0201220 | A1 * | 8/2007 | Ulicny | B65D 23/00 362/101 |
| 2008/0224988 | A1 * | 9/2008 | Whang | G09G 3/3406 345/102 |

(Continued)

*Primary Examiner* — Crystal L Hammond (57) ABSTRACT

A mobile dispensing device comprising at least three or more light sets with each light set having a different region associated with the device and at least one of the lights sets is configured to provide illumination when the device is in the act of dispensing and least one of the other light sets is configured to provide focused illumination when the mobile dispensing device is not involved in the act of dispensing. The device further being configured to read one or more inputs/sensors that are used to determine a lighting condition that either overrides, supplements or is implemented independently of any lighting condition associated with the detected motion and tilting angle of the device.

20 Claims, 7 Drawing Sheets (56) References Cited

U.S. PATENT DOCUMENTS

| | | | |
|---|---|---|---|
| 2009/0312101 A1* | 12/2009 | Pope | A63F 13/06 463/36 |
| 2010/0176154 A1* | 7/2010 | Whitcombe | A47G 19/24 222/113 |
| 2012/0274218 A1* | 11/2012 | Mountain | H04M 1/22 315/152 |
| 2014/0099853 A1* | 4/2014 | Condon | A63H 30/04 446/37 |
| 2014/0300273 A1* | 10/2014 | LeBrun | G09F 23/06 315/76 |
| 2015/0354793 A1* | 12/2015 | Huang | G03B 15/02 362/6 |
| 2016/0286625 A1* | 9/2016 | Olsen | H05B 33/0854 |

* cited by examiner

ILLUMINATION SYSTEM FOR MOBILE DISPENSING DEVICES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD

The present application relates to illuminated dispensing devices and particular to portable dispensing devices.

BACKGROUND

In a previous U.S. Pat. No. 8,796,939 B1 (hereby incorporated by reference), by Curtis William Naumann, the inventor in the current application, the inventor addressed the issue that in poor lighting conditions (e.g. such as restaurants and bars that frequently dim the lights to set the mood) it is difficult to determine the amount and location of items dispensed from a dispensing device (e.g. salt shaker, ketchup bottle . . . etc.), read text and locate objects in the nearby vicinity.

In order to overcome these deficiencies, a system and method for providing illumination for a mobile dispensing device was described comprising two sets of lights and an accelerometer configured to detect the motion and tipping angle of the mobile dispensing device. The detected motion and tipping angle were then used to determine and then subsequently implement the desired illumination/lighting effect in the light sets.

While two sets of lights may be effective, for example, a closed ketchup bottle with a first set of lights associated with the side of the bottle (to provide ambiance) and a second set of lights associated with the top of the bottle (intended to illuminate the surface onto which the ketchup is to be dispensed) can be effectively used to read a menu or search for a lost item under the table as long as the cap remains on the bottle. That is not the case for other devices such as a salt shaker. A salt shaker typically does not have a means of constraining the contents within the dispenser when tilted into the dispensing position. As a result, if you were to try and utilize the lights associated with illuminating the dispensing surface for reading or looking for objects then you will end up with contents all over the item you are trying to read and/on the floor if that is where you thought you lost your item.

Therefore, there continues to be a need to read text and locate objects nearby where the first set of lights associated with providing diffuse lighting is insufficient to accomplish the task and the second set of lights is unusable for the task because the dispensing device does not have the ability to constrain its contents when the second set of lights, configured to illuminate a surface to be dispensed, is illuminated.

SUMMARY

In order to overcome the deficiencies in the prior art, systems and methods are described herein.

One aspect of the claimed invention involves a mobile dispensing device comprising at least three or more light sets with each light set having a different region associated with the device and wherein at least one of the lights sets is configured to provide illumination of the surface onto which the contents of the device will be dispensed when, based upon the determined motion and tilting of the device, the device is in act of dispensing and least one of the other light sets is configured to provide focused illumination when the mobile dispensing device is not involved in the act of dispensing, based upon the determined motion and tilting of the device.

Another aspect involves a method for providing illumination for a mobile dispensing device by using a processor based illumination system to control three or more light sets based by detecting the motion and tilt of the of the device and determining, based on that detection, whether or not there should be change in at least one of the three or more light sets and implementing the change, if applicable, wherein at least one of the lights sets is configured to provide illumination of the surface onto which the contents of the device will be dispensed when, based upon the determined motion and tilting of the device, the device is in act of dispensing and least one of the other light sets is configured to provide focused illumination when the mobile dispensing device is not involved in the act of dispensing, based upon the determined motion and tilting of the device.

These and other aspects described herein present in the claims result in features and/or can provide advantages over current technology.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages or features are mutually exclusive or contradictory, in that they cannot be simultaneously present in a single embodiment. Similarly, some advantages are applicable to one aspect of the invention, and inapplicable to others. Thus, the elaborated features and advantages should not be considered dispositive in determining equivalence. Additional features and advantages of the invention will become apparent in the following description, from the drawings, and from the claims.

DETAILED DESCRIPTION

The instant devices and approach provide a way to read printed text and locate nearby objects in situations where a first set of lights associated with a dispensing device is insufficient to accomplish the task and where a second set of lights is unusable for the task because the dispensing device does not have the ability to constrain its contents when the second set of lights, configured to illuminate a surface to be dispensed, is illuminated.

While one approach is to simply increase the capabilities of the first set of lights, for example to brighten them to the point that they can be used to read text in the nearby vicinity and locate objects nearby, this may not be appropriate in all situations. A situation where it may not be appropriate is when the first set of lights is associated with the sides of the dispensing device in order to provide focus of the device's orientation and shape and add ambiance to the surrounding area. In such a case, brightening them to the point that they are able to accomplish the tasks of reading and locating nearby objects may make them blinding and or distract/disturb others in the nearby area.

The approach to be discussed herein is to have three or more sets of lights that work together: a first set of lights configured to illuminate the one or more surfaces of a mobile dispensing device and to activate when the device is being used; a second set of lights configured to illuminate during the act of dispensing and to provide lighting onto the surface onto which the contents of the dispenser are intended to be placed; and at least a third set of lights configured to provide directed illumination for situations other than dispensing.

Before delving into the approach involving three or more light sets, it is important to understand that the term "set of lights" (or "light set") is inclusive of a single lighting element as well as more than one lighting element. Rather than the number of elements in the set being important, what is important is that the lighting units within the set are configured to achieve a desired lighting effect. For instance, a single three colored LED comprising a red, green, and blue bulb can be combined together to produce white light (or other color) based upon their respective combinations. It should also be noted that while the lights in a set would all typically be doing the same action (e.g. all turned on at the same time and power to create a uniform illumination) other lighting effects where members of the set are selectively illuminated, such as dimming the lights starting at the top or forming a pattern, are also anticipated.

Returning to solutions comprising three or more sets of lights, a representative embodiments will now be described.

Figure 1:
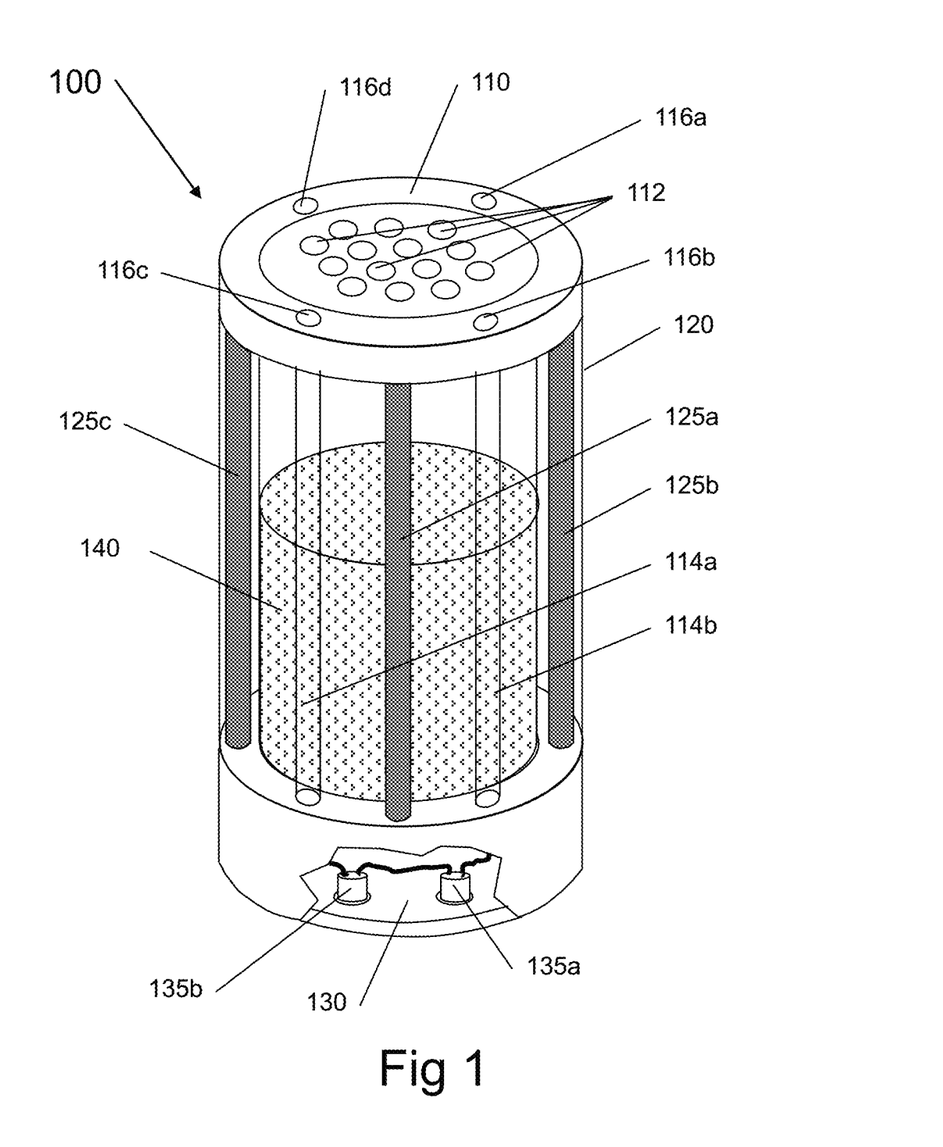
FIG. 1 shows, in simplified form, a representative mobile dispensing device.

FIG. 1 shows, in simplified form, a representative mobile dispensing device 100. The device 100 has a dispensing location/top 110, side 120 and a bottom 130 that is visible through the cut away. [It should be noted that the terms top, side, and bottom are arbitrary and not meant to specify specific locations of the devices in general but should be simply thought of as different aspects of the mobile dispensing device. For instance, a hyperrectangle has what would typically be considered atop, bottom and either four separate sides or collectively sides, which may all be separately illuminated. Further, while a teapot does have what would be considered a top, bottom and potentially a plurality of sides, the contents of the teapot are dispensed from the spout, which is not necessarily the "top", and "top" should be interpreted as the dispensing location and "side" and "bottom" should be interpreted as additional regions of the mobile dispensing device that are other than the "top".]

Associated with the side 120 (represented as translucent, which advantageously allows you to see the contents of the device) is a first light set 125a, 125b, 125c. In this particular case, the first light set 125a, 125b, 125c are represented as diffusing light tubes (presumed to be roughly equally spaced around the sides of the device) and configured to disperse light along their entire length but just as easily could have been one or more discrete lighting components. The first light set 125a, 125b, 125c may all be illuminated in the same or different colors and/or levels of illumination depending on the desired lighting effect. [Note: in cases of non-symmetric distribution of lights around the device, such as when the first set of lights is associated with one of several sides of the device, the first set of lights can alternatively be utilized to provide focused rather than disperse illumination].

Also visible through the side 120 are transmitting light tubes 114a, 114b that are designed to transmit light to the top 110 rather than diffuse light along the slides. An example of transmitting light tubes 114a, 114b, which are pathways for light to travel that have reflective surfaces that prevents/minimize the amount on light that escapes prior to reaching its destination, are fiber optic cables and translucent plastic tubes where the light travels through a medium such as glass or plastic. Alternatively, the light could simply travel through a hole/pipe running through the solid sides of the device such that the light travels through air (or other liquid) and the reflective sides of the hole/pipe cause the light to be transmitted rather than diffused. The use of transmitting light tubes 114a, 114b is advantageous because all of the lighting sources can be in a single location (the bottom in this case) and thus powered by a single power supply without requiring wires to run through the side 120. Additionally, using light tubes is advantageous because it allows for the contents storage portion of the device to be separated from the electronics portion of the device. Separating of the two portions is advantageous because in some applications the contents portion of the device may need to be commercially cleaned for safety.

Associated with the top 110 are one or more apertures 112 through which the contents 140 of the device 100 can be dispensed. Also, associated with the top 110 is a second light set 116a, 116b, 116c, 116d. As represented, the second light set 116a, 116b, 116c, 116d receives light through the transmitting light tubes, of which only two 114a, 114b are visible that is subsequently used to create illumination. [Note as an alternative to using transmitted lighting, the second light set 116a, 116b, 116c, 116d could just have easily been discrete lighting units (e.g. LEDs) located in the top 110 that provide their own illumination rather than using received light to create illumination.]

Similar to the first light set 125a, 125b, 125c, the second light set 116a, 116b, 116c, 116d may all be the same or different colors and/or levels of illumination depending on the desired lighting effect.

Associated with the bottom 130, and visible through the cut away, is a third set of lights 135a, 135b that are represented as discrete lighting units. The third light set is shown as connected in series but the lights may also be individually controlled and similar to the first light set 125a, 125b, 125c. The third set of lights 135a, 135b may all be the same or different colors and/or levels of illumination depending on the desired lighting effect.

It should also be noted that the light could alternatively have been transmitted from the top 110 to the bottom 130 (or from the side 120 to both the top 110 and bottom 130). The importance being that there are at least three light sets configured to create a desired lighting effect and not necessarily where the light originates.

Figure 2:
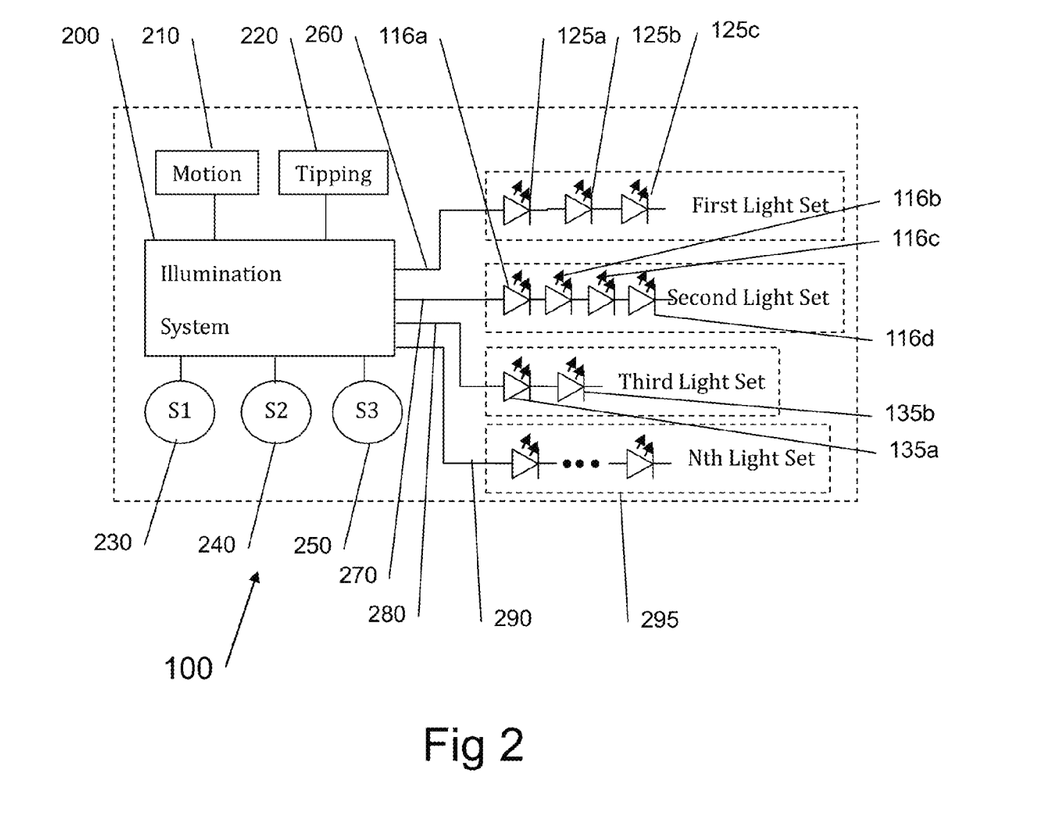
FIG. 2 illustrates a block diagram of a mobile dispensing device constructed in accordance with an embodiment of the invention.

In order to control the three or more light sets the mobile dispensing device needs to have an illumination system. FIG. 2 illustrates a block diagram of a mobile dispensing device 100 constructed in accordance with an embodiment of the invention. The three or more light sets of the mobile dispensing device 100 are controlled by an illumination system 200. The illumination system 200 contains a microprocessor and is connected to and configured to interpret data from both a motion detector 210 and a tipping sensor 220. [Note: The motion detector 210 and the tipping sensor 220 may be separate components as shown or incorporated into a single component such as an accelerometer.] The illumination system 200 controls the three or more sets (with the Nth light sight 295 representing any number of light sets greater than three) through one or more bus lines 260, 270, 280, 290 to produce a desired lighting effect. Additionally, the illumination system 200 optionally receives input from one or more sensors/inputs S1 230, S2 240 and S3 250, which may further be used as input in order to determine additional desired lighting effects to produce.

Figure 3:
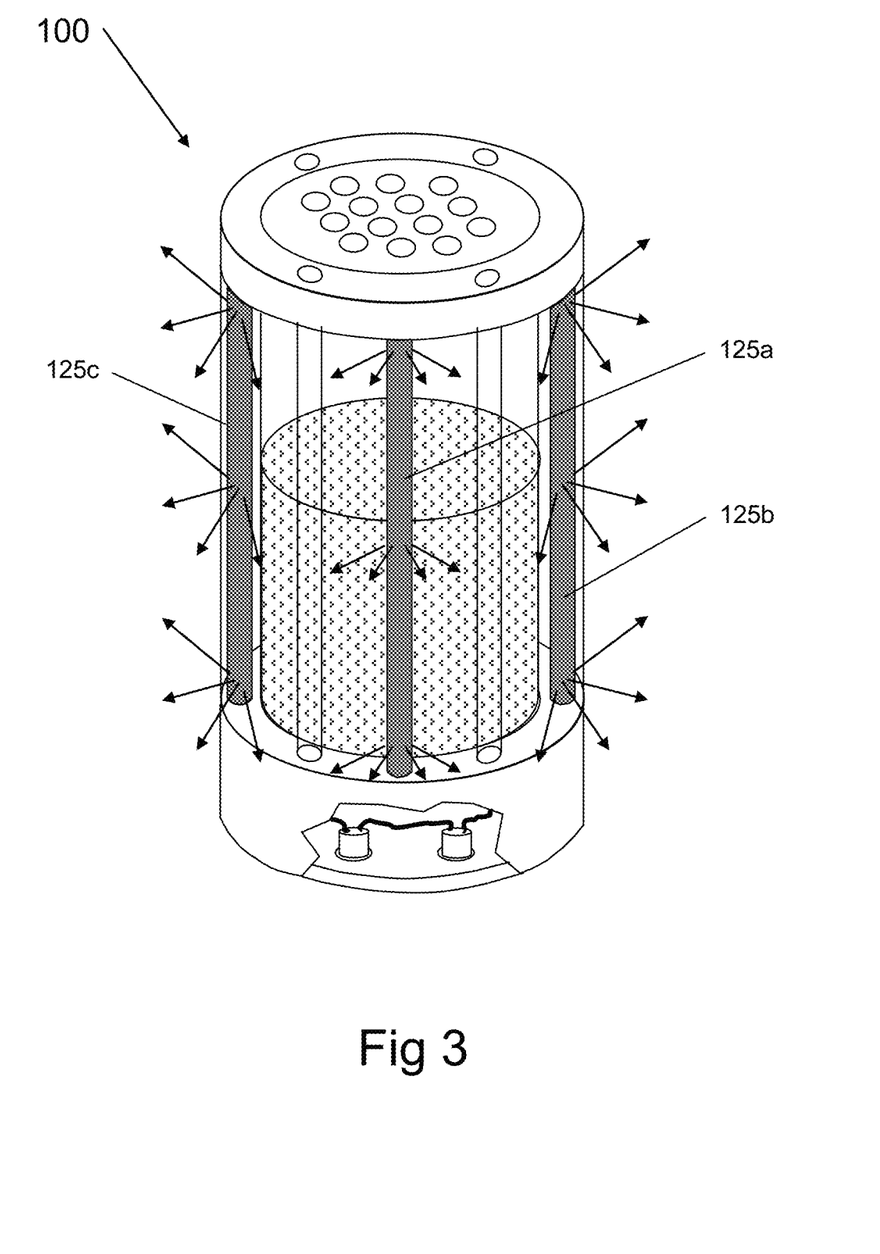
FIG. 3 shows, in simplified form, lighting of the sides of the device.

In operation, the illumination system 200 detects usage such as when the mobile dispensing device is picked up. Once it has been detected that the device is being used, the illumination system 200 then transmits a signal to the side/first set of lights 125a, 125b, 125c on the device 100 to power on to create an ambient lighting effect (e.g. at full power and possibly a particular color based upon the input from sensor S1 230, which in this case might be a dip switch). In this manner, the sides of the device 100 are illuminated for ease in determining orientation and physical characteristics (e.g. shape) of the mobile dispensing device 100 and adding ambiance to the area. This effect is illustrated in FIG. 3. FIG. 3 shows, in simplified form, lighting of the sides of the device 100 using the side/first set of lights 125a, 125b, 125c. While it is anticipated that the side/first set of lights 125a, 125b, 125c will remain on the entire time the device is in use, even when the other lights are displaying a desired effect, other options such as the side/first light set dimming or turning off completely are also anticipated. For example, in high precision situations, such as when the mobile dispensing device is a syringe, it maybe desirable to turn off the side/first set of lights so that only the second set of lights are powered on to illuminate the injection area.

Furthermore, once the illumination system 200 of FIG. 2 no longer detects movement such as when the mobile dispensing device 100 is placed back down or has fallen over, the side/first set of lights 125a, 125b, 125c may progressively dim over a configured period until the first set of lights 125a, 125b, 125c is turned off. If movement is detected in the mobile dispensing device 100 during the dimming period, the illumination system 200 will transmit a signal to the side/first set of lights 125a, 125b, 125c to again create the ambient lighting effect.

It should be noted that in order to more accurately detect deliberate movement of the mobile dispensing device 100, and avoid illuminating the mobile dispensing device 100 when extraneous movement is detected, such as placing something on the table surface or bumping the table, software programmed within the illumination system 200 may be programmed to not illuminate the side/first set of lights 125a, 125b, 125c until movement exceeds a configurable movement threshold parameter.

Figure 4:
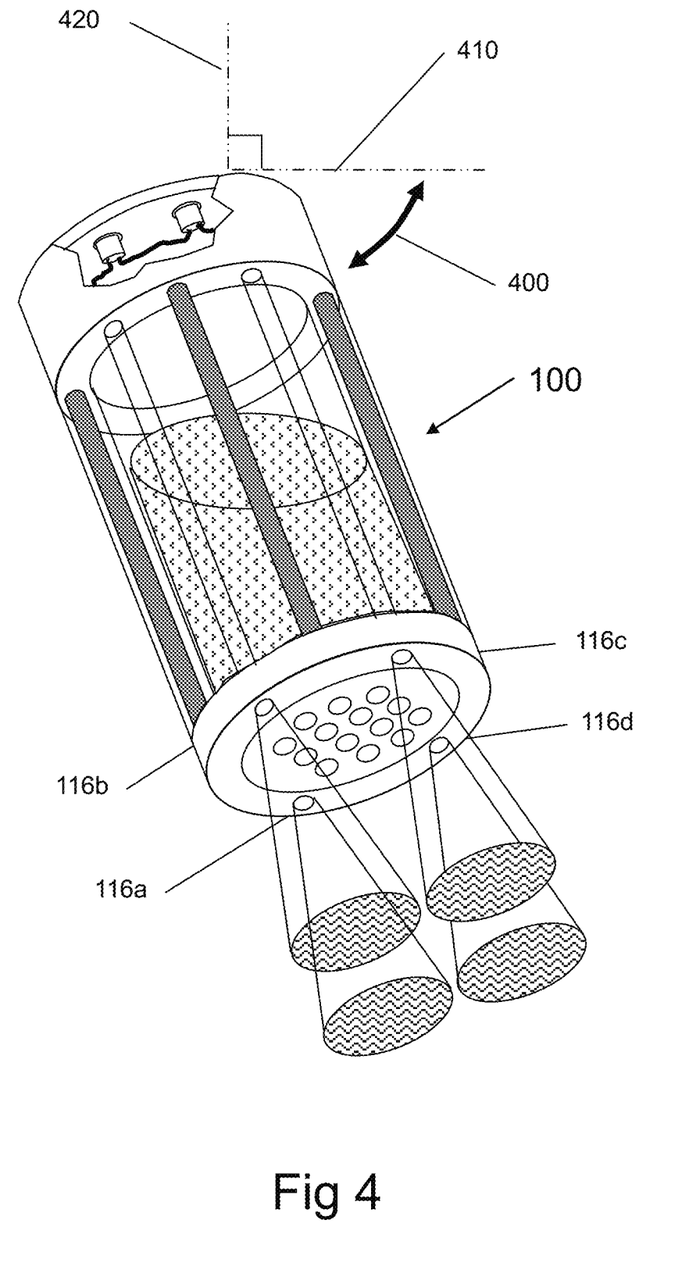
FIG. 4 shows, in simplified form, lighting of the top of the device.

Aside from movement, the illumination system 200 detects the tipping angle using tipping sensor 220 of the mobile dispensing device 100. If the tipping angle becomes greater than or equal to a configurable dispensing tipping point parameter, the illumination system will transmit a signal to the top/second set of lights 116a, 116b, 116c, 116d to power on in order to create a specific lighting effect (e.g. maximum brightness). In this manner, the mobile dispenser device 100 can be used as a spotlight to illuminate the dispensing area for quantity and location of device contents delivered. The term "spotlight" refers to a focused light beam, predominantly directed in a single direction with a beam spread of less than 180 degrees (and with values of less than or equal to 160, 90, 60, 30 or 15 degrees being typical) and/or not configured to shine directly into a user's eyes during anticipated usage, rather than diffuse lighting, which is typically multi directional (greater than/equal to 180 degrees) and often configured to be directly observable by the user. This effect is illustrated in FIG. 4. FIG. 4 shows, in simplified form, lighting of the top of the device 100.

Specifically, FIG. 4 shows the mobile dispensing device 100 tipping past the configurable dispensing tipping point 400, from a theoretical horizontal 410 (or 90 degrees plus the dispensing tipping angle 400 from the theoretical vertical 420/upright position of the device) and as such the top/second set of lights 115a, 115b, 115c, 115d are illuminated. While a typical configurable dispensing tipping point might be 45 degrees, other tipping points might be individually based upon the material in the device. For example high viscosity substances like honey or motor oil might require the angle to be greater than 45 degrees. Similarly, low density substances such as feathers or objects that have a high cohesion (e.g. gummy bears) might also require a higher angle. However, high flow items like water or marbles might benefit from having a lower angle.

Returning to FIG. 2, once the tipping angle becomes less than the dispensing tipping point parameter, such as when the mobile dispensing device 100 is returned to its upright position, the top/second set of lights 116a, 116b, 116c, 116d will create another lighting effect, in this case an non illuminating condition (e.g. gradually dim over a configured period of time until the top/second set of lights 116a, 116b, 116c, 116d is turned off). Also, if the tipping angle becomes greater than the configured dispensing tipping point angle while the mobile dispensing device 100 is dimming then the top/second set of lights 116a, 116b, 116c, 116d will again illuminate at maximum brightness.

With respect to the top/second set of lights 116a, 116b, 116c, 116d, it would be inappropriate to try to read text and/or attempt to locate objects nearby with this light set because the portable dispensing device, as shown, does not have a way of constraining the contents when the top/second set of lights 116a, 116b, 116c, 116d would be illuminated. As such, a bottom/third set of lights 135a, 135b has been included in the mobile dispensing device 100.

Figure 5:
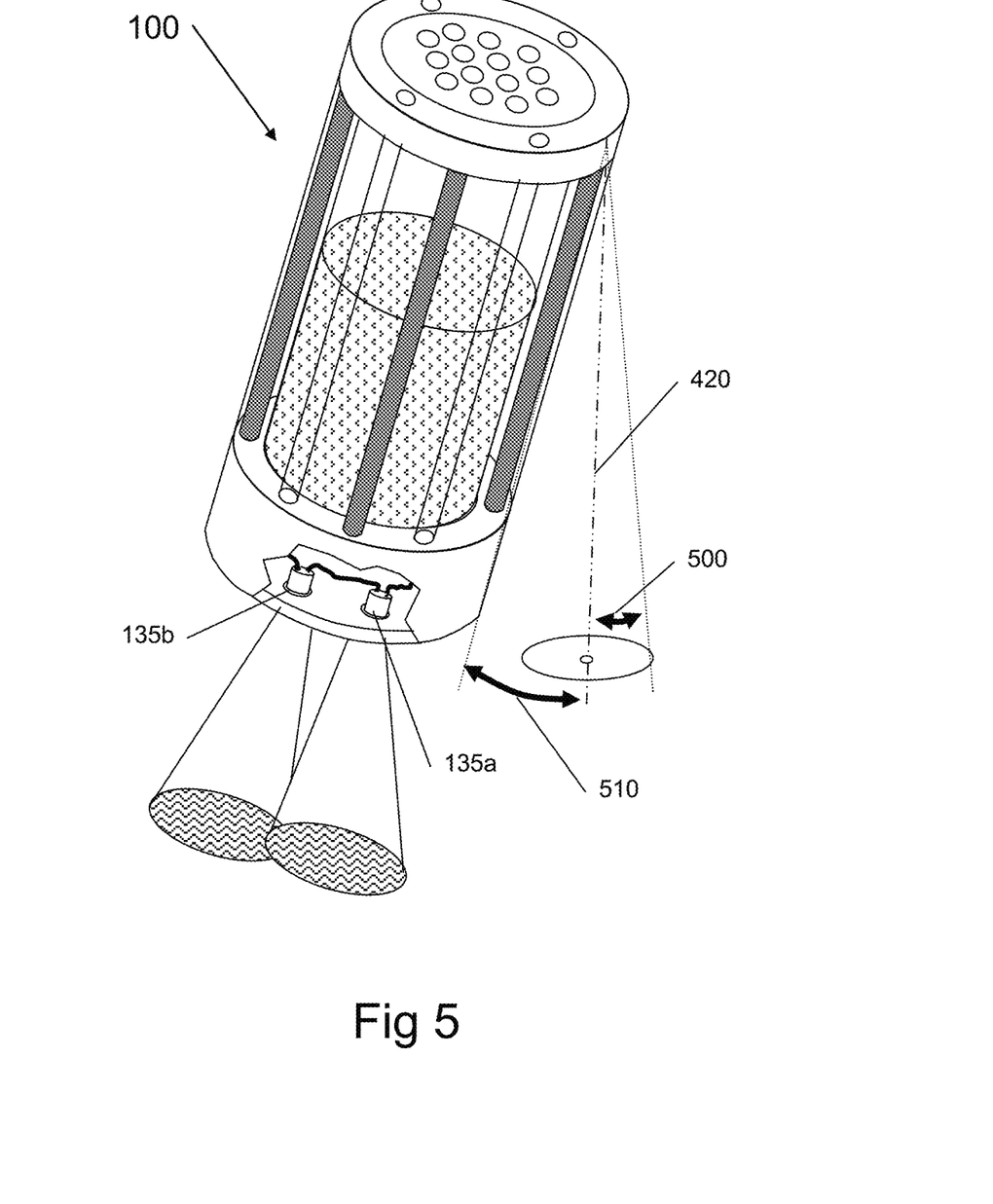
FIG. 5, shows, in simplified form, lighting of the bottom of the device.

As previously stated, the illumination system 200 detects the tipping angle using tipping sensor 220 of the mobile dispensing device 100. If the tipping angle is greater than or equal to the a configurable spotlight "ON" tipping point and is less than or equal to the a configurable spotlight "OFF" tipping point then a lighting effect (e.g. maximum lighting) will be implemented for the bottom/third set of lights 135a, 135b. This effect is illustrated in FIG. 5. FIG. 5 shows, in simplified form, lighting of the bottom of the device 100.

Specifically in FIG. 5, the device 100 has been tipped beyond the configurable spotlight "ON" tipping point 500 and is still less than or equal to the configurable spotlight "OFF" tipping point 510 and, as such, the bottom/third set of lights 135a, 135b are illuminated. [Note: in some application, it is desirable that the configurable spotlight "ON" tipping point 500 be zero such that the bottom/third set of lights 135a, 135b are illuminated when movement is initially detected such that they power on when the first set of lights power on.] For reference, a typical configurable spotlight "OFF" tipping point 510 is 45 degrees form the theoretical vertical 420 (upright position). It should be noted that in a typical application the configurable spotlight "OFF" tipping point 510 is always less than the angle that would cause the device to be associated with the act of dispensing.

Furthermore, returning to FIG. 2, once the tipping angle becomes greater than the configurable spotlight "OFF" tipping point (or less than configurable spotlight "ON" tipping point) then a new lighting effect will be implemented (e.g. dim over a configured period until the top/second set of lights 135a, 135b is turned off).

Figure 6:
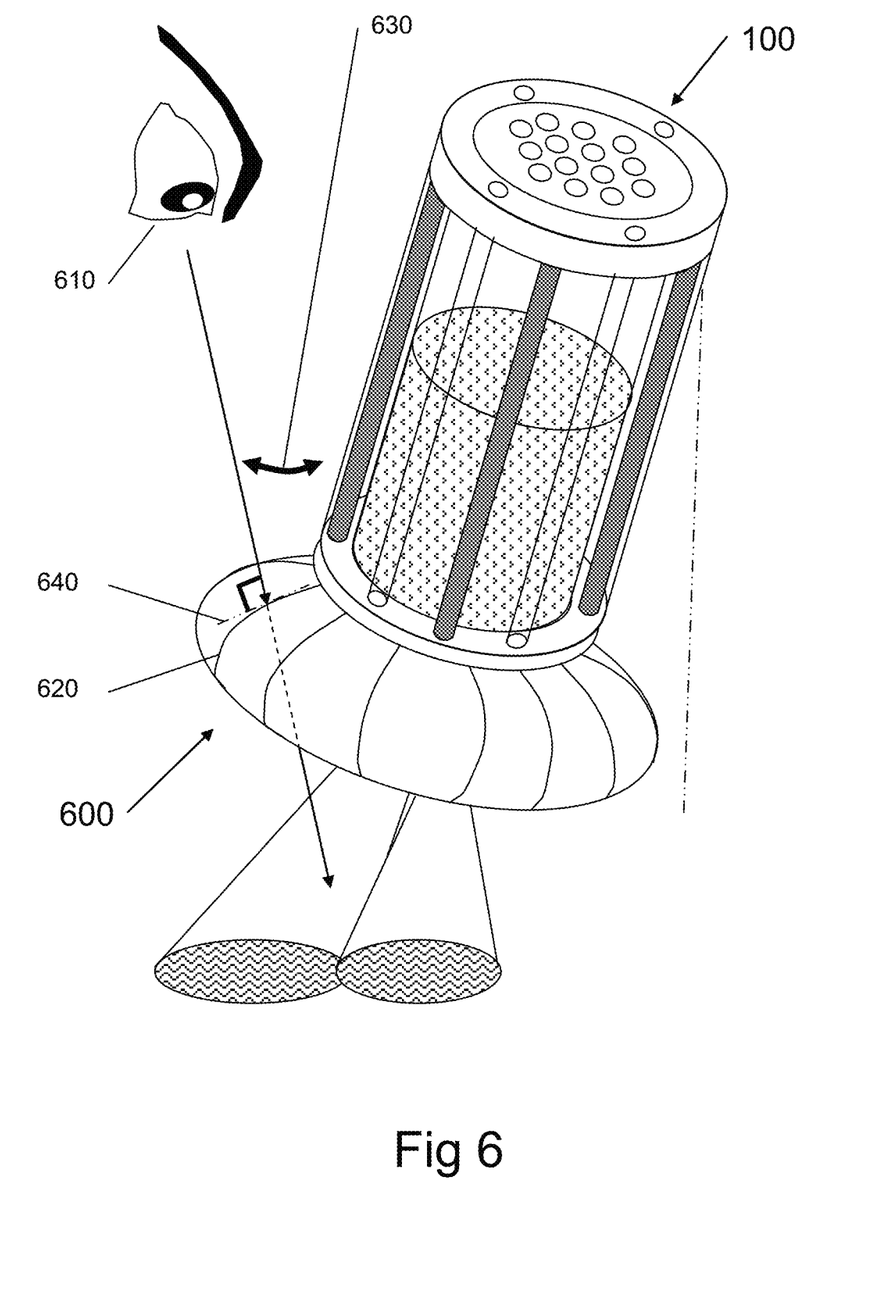
FIG. 6, shows, in simplified form, the addition of a magnification attachment.

Additionally, it is useful to provide a magnification system that can be used in tandem with the third set of lights in order to magnify at least a portion of the area illuminated by the third light set. FIG. 6 shows, in simplified form, the addition of a magnification attachment 600 attached to device 100 that may be a separate piece or integral to the mobile dispensing device.

In order to provide magnification to a viewer 610, the magnification attachment 600 must have at least one transparent convex surface 620 (inclusive of Fresnel lenses) that may be on at least the top of the magnification attachment 600, the bottom surface (not shown) or both. The tangent of the midpoint 640 of the at least one transparent convex surface 620 should be approximately perpendicular to the expected viewing angle 630 of the viewer 610 and in order to prevent distortion both the top and bottom of the magnification attachment 600 should be approximately perpendicular to the expected viewing angle 630.

In this particular case, the magnification attachment 600 and the transparent convex surface 620 are shown as encircling the entire dispensing device 100. However, partial configurations, with built in discrete magnification lens locations are also anticipated, rather than the entire magnification attachment 600 being a lens.

Up to this point, with the exception of the addition of magnification, basic functionality has been described. Other embodiments describing enhanced functionality will now be described.

In addition to providing the ability to illuminate a surface onto which the contents of the device are intended to be dispensed and providing a way of illuminating text and objects nearby vicinity without dispensing the contents of the device, additional functionality can be added by incorporating the one or more optional sensors/inputs S1 230, S2 240, and S3 250 (collectively referred to as the sensors) of FIG. 2, which are readable by illumination system 200.

As previously mentioned, the input from the sensors can be used to separately determine a lighting effect to be implemented in the three or more light sets (or the two or more light sets specified in U.S. Pat. No. 8,796,939 B1) that may used to override, supplement or be used independently of the lighting effects based upon the motion detector 210 and the tipping sensor 220. Alternatively, the lighting effects based upon the motion detector 210 and the tipping sensor 220 could be used to override, supplement or be used independently of the lighting effect based upon the input from the sensors.

Examples of sensors(/inputs) include the simple switches used to specify the illumination colors for at least one of the three or more light sets; light sensors used to determine the amount of ambient light, and if there is sufficient light then set an override lighting condition that none, one, two, or three or more of the light sets will remain off; the sensors may be temperature sensors, which may be useful for determining if the contents of the device are potentially spoiled; the sensors may be timers, which can be useful for determining if the contents of the device has reached its expiration date; voltage sensors, which are useful for detecting low battery conditions and blinking one of the light sets to indicate the batteries need to be changed, and even stored information that indicates the contents of the device, which can be useful for prefilled devices such as syringes, where the color indicates the contents of the syringe (e.g. blue for antibiotics and red for anesthesia). The list above is not meant to be an exhaustive list but simply represent illustrative examples of the type of sensors and how various sensors may be utilized.

Additional functionality can also be gained by making additional use of the motion detector and tilt sensors. Rather than just the simple motion conditions (moving verses not moving) and tilting beyond a predetermined condition, more complex patterns motion patterns can be analyzed and lighting effects be implemented based upon those conditions being detected.

For example, the top set of lights of a salt shaker may be provide white light when the configurable dispensing tipping point has been achieved but turns to red when it has been detected that a shaking motion has been done more than a predetermined number of times (e.g. three or more times), which can be incredibly useful for people on a low salt diet. To further enhance the device 100, such as when being used to monitor salt intake, the illumination system 200 may also incorporate visual and/or wireless output (e.g. BlueTooth) in order to communicate data based on the conditions causing the various lighting effects to be implemented.

Figure 7:
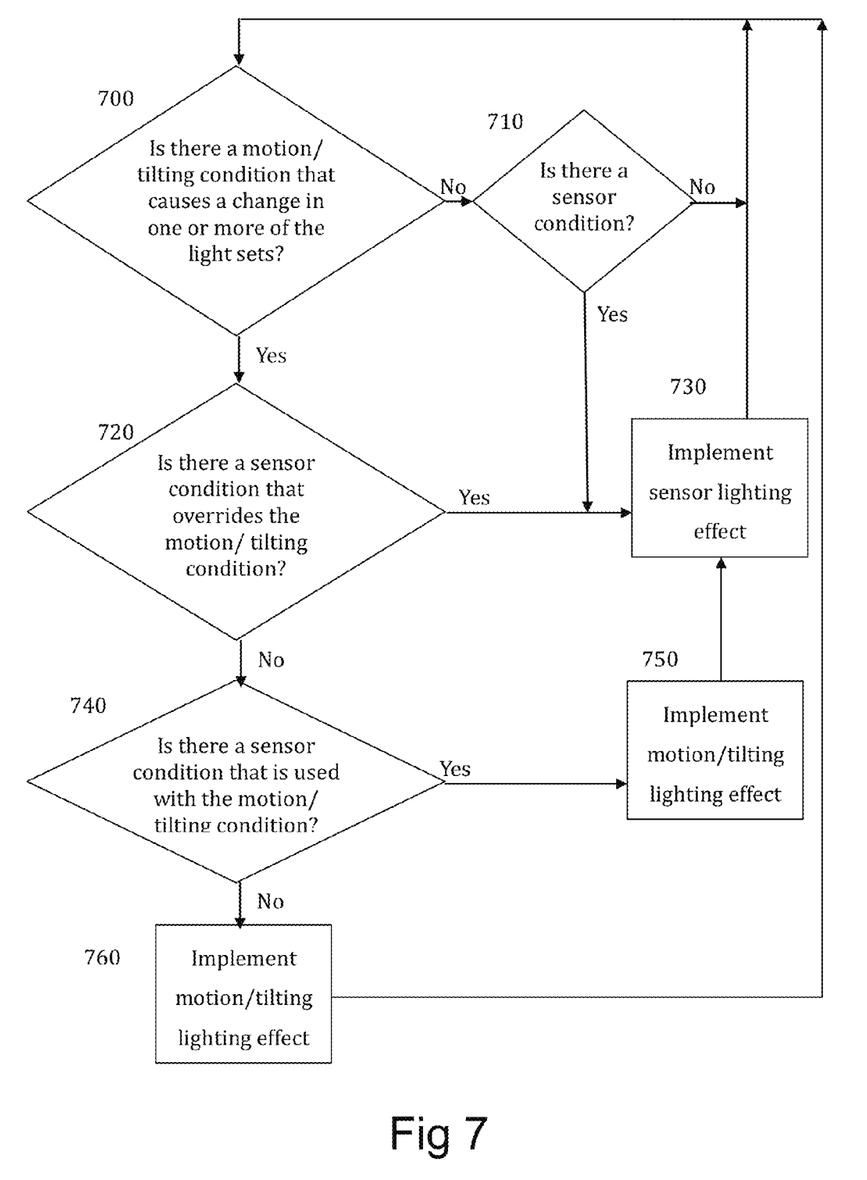
FIG. 7 shows, in simplified form, a process flow diagram for controlling the three or more lights sets.

In order to further the readers understanding of how the various desired lighting effects will work together, FIG. 7 shows, in simplified form, a process flow diagram for controlling the three or more lights sets. The process begins with step 700, which is a decision, is there a motion/tilting condition that causes a change in one or more of the light sets?

If the answer to Step 700 is "No" then proceed to step 710, which is a decision, is there a sensor condition?

If the answer to Step 710 is also "No" then the process returns to Step 700. If the answer to Step 710 is "Yes" then the sensor lighting effect is implemented, Step 730, prior to returning to Step 700.

If the answer to Step 700 was "Yes" then the process proceeds to Step 720, which is a decision, is there a sensor condition that overrides the motion/tilting condition?

If the answer to Step 720 is "Yes" then the sensor lighting effect is implemented, Step 730, prior to returning to Step 700.

If the answer to Step 720 was "No" then the process proceeds to Step 740, which is a decision, is there a sensor condition that is used with the motion/tilting condition?

If the answer to Step 740 is "Yes" then both motion/tilting lighting effect, Step 750, and the sensor lighting effect, Step 730, are implement prior to returning to Step 700.

If the answer to Step 740 was "No" then the process proceeds to Step 760, which is to implement motion/tilting lighting effect prior to returning to Step 700.

While several specific devices have been mentioned in an exemplary fashion a non exhaustive list of a few other examples for which the systems and method specified herein are applicable include tableware: cruets, gravy boats, pitchers (basically anything that sits on the table and pours); Kitchenware: storage containers (flour, sugar, coffee, etc.), bottles, pitchers, measuring cups, measuring spoons, etc.; General storage containers (e.g. garage containers with nails, fertilizers, paints, etc); Medical/Lab: pill bottles, beakers, test tubes; Infants items: toddler cups, baby bottles (warm glow when touched or moved, possibly slowly turning up brightness and slowly turning it back down when not being touched, different color glow around top of bottle for baby to easily see for using or if temperature sensor included glowing red if too hot and green if just right.)

Finally, it is to be understood that various different variants of the invention, including representative embodiments and extensions have been presented to assist in understanding the invention. It should be understood that such implementations are not to be considered limitations on either the invention or equivalents except to the extent they are expressly in the claims. It should therefore be understood that, for the convenience of the reader, the above description has only focused on a representative sample of all possible embodiments, a sample that teaches the principles of the invention. The description has not attempted to exhaustively enumerate all possible permutations, combinations or variations of the invention, since others will necessarily arise out of combining aspects of different variants described herein to form new variants, through the use of particular hardware or software, or through specific types of applications in which the invention can be used. That alternate embodiments may not have been presented for a specific portion of the description, or that further undescribed alternate or variant embodiments may be available for a portion of the invention, is not to be considered a disclaimer of those alternate or variant embodiments to the extent they also incorporate the minimum essential aspects of the invention, as claimed in the appended claims, or an equivalent thereof.

What is claimed:

1. A mobile dispensing device comprising:
    three or more light sets comprising at least a first, second, and a third light set;
    three or more regions comprising at least a first, second, and third regions, wherein the first region has associated with it a first light set, the second region has associated with it a second light set, and the third region has associated with it a third light set;
    wherein the first light set is configured to provide one or more of either diffuse or focused illumination;
    wherein the second region also has associated with it one or more apertures configured to allow contents of the device to be dispensed and wherein the second light set is configured to provide illumination of surface onto which the contents are to be dispensed;
    wherein the third light set is configured to provide at least focused illumination;
    a motion detector;
    a tilt sensor;
    an illumination system configured to determine, using the motion detector and tilt sensor, a motion and tilting angle of the device and, based on the determined motion and tilting angle, control one or more of the first, second or third light set to produce a first lighting effect associated with the determined motion and tilting angle; and
    wherein the first region is associated with the one or more sides of the dispensing device and the second region is associated with the top of the dispensing device and the third region is associated with the bottom of the dispensing device.

2. The device of claim 1 wherein the device has a shape and wherein the first light set provides diffuse illumination and the first light set is configured to provide focus of the device's shape.

3. The device of claim 1 wherein the device has an orientation and wherein the first light set provides diffuse illumination and the first light set is configured to provide focus of the device's orientation.

4. The device of claim 1 wherein the motion detector and tilting sensor are a single component, an accelerometer.

5. The device of claim 1 wherein the third light set is configured to provide illumination for the purpose of reading.

6. The device of claim 1 further comprising a magnification system configured to magnify at least a portion of the area illuminated by the third light set.

7. The device of claim 1 further comprising one or more inputs readable by the illumination system.

8. The device of claim 7 wherein the illumination system is configured to read the one or more inputs and, based on the reading, control one or more of the first, second, or third light set to produce a second lighting effect associated with the reading.

9. The device of claim 8 wherein there is a relationship between the first lighting effect and the second lighting effect and the relation is that the second lighting effect either overrides, supplements or is produced independently of the first lighting effect.

10. The device of claim 8 wherein there is a relationship between the first lighting effect and the second lighting effect and the relation is that the first lighting effect either overrides, supplements or is produced independently of the second lighting effect.

11. A method for providing illumination for a mobile dispensing device by an illumination system, comprising using a processor associated with the illumination system to:
    detect the motion and tilt of the of the device;
    determine based upon motion and tilt of the of the device whether there should be a change based on the detected motion and tilt of the device in one or more of three or more light sets associated with the devices and implementing the change;
    wherein the three or more light sets comprise at least a first, second, and third light sets;
    wherein the first light set is associated with one or more sides of the mobile dispensing device and is configured to provide one or more of either diffuse or focused illumination and wherein the illumination system is configured to change the status of the first light set, from a non illuminating to an illuminating condition, at least when the device goes from not moving to moving;
    wherein the second light set is associated with the top of the mobile dispensing device and is configured to provide illumination of surface onto which the contents of the device are to be dispensed and wherein the illumination system is configured to change the status of the second light set, from a non illuminating to an illuminating condition, at least when the tilt of the device is greater than or equal to the level of tilt associated with the act of dispensing; and
    wherein the third light set is associated with the bottom of the mobile dispensing device and is configured to provide at least focused illumination and wherein the illumination system is configured to change the status of the third light set, from an illuminating to an non illuminating condition, at least when the tilt is less than the level of tilt associated with the act of dispensing.

12. The method of claim 11 wherein the illumination system is further configured to change the status of the first light set, from an illuminating to a non illuminating condition, when the device goes from moving to not moving.

13. The method of claim 11 wherein the illumination system is further configured to change the status of the second light set, from an illuminating to an non illuminating condition, when the tilt of the device is less than or equal to the level of tilt associated with the act of dispensing.

14. The method of claim 11 wherein the illumination system has a configurable tipping point beyond which the third light set is to change from an illuminating to a non illuminating condition and the illumination is further configured to change the status of the third light set, from non illuminating to an illuminating condition, when the device changes from not moving to moving and the tilt is less than the configurable tipping point.

15. The method of claim 11 wherein the third light set is configured to provide illumination for the purpose of reading.

16. The method of claim 11 where in the device further comprises a magnification system configured to magnify at least a portion of the area illuminated by the third light set.

17. The method of claim 11 where in the device further comprises one or more inputs readable by the illumination system.

18. The method of claim 11 where in the device further comprises one or more inputs readable by the illumination system and further comprising using the processor to:
  read the one or more inputs;
  determine, based upon the reading, if there is a lighting effect associated with reading that overrides the change in one or more of three or more light sets; and
  implement that lighting effect associated with the reading.

19. The method of claim 11 where in the device further comprises one or more inputs readable by the illumination system and further comprising using the processor to:
  read the one or more inputs;
  determine, based upon the reading, if there is a lighting effect associated with reading that supplements the change in one or more of three or more light sets; and
  implement the change and the lighting effect associated with the reading.

20. The method of claim 11 where in the device further comprises one or more inputs readable by the illumination system and further comprising using the processor to:
  read the one or more inputs;
  determine, based upon the reading, if there is a lighting effect associated with reading that is independent of the change in one or more of three or more light sets; and
  implement that lighting effect associated with the reading.

* * * * *